United States Patent [19]

Iwata

[11] Patent Number: 5,291,389
[45] Date of Patent: Mar. 1, 1994

[54] SEQUENTIAL FUNCTION CHART (SFC) CONTROLLER FOR CONTROLLING A MACHINE IN REVERSE OPERATION

[75] Inventor: Yasunobu Iwata, Aichi, Japan

[73] Assignee: Mitsubishi Denki Kabushiki Kaisha, Tokyo, Japan

[21] Appl. No.: 695,493

[22] Filed: May 2, 1991

[30] Foreign Application Priority Data

May 8, 1990 [JP] Japan .................. 2-118190

[51] Int. Cl.⁵ .................. G05B 11/01; G05B 19/04
[52] U.S. Cl. .................. 364/140; 364/141
[58] Field of Search .................. 364/131, 140, 141; 395/275, 325

[56] References Cited

U.S. PATENT DOCUMENTS

| | | | |
|---|---|---|---|
| 4,683,549 | 7/1987 | Takaki | 364/141 |
| 4,858,101 | 8/1989 | Stewart et al. | 364/131 |
| 4,876,664 | 10/1989 | Bittorf et al. | 395/200 |
| 4,937,777 | 6/1990 | Flood et al. | 395/725 |
| 5,128,857 | 7/1992 | Okada et al. | 364/140 |

FOREIGN PATENT DOCUMENTS

| | | |
|---|---|---|
| 0069375 | 1/1983 | European Pat. Off. |
| 0314190 | 5/1989 | European Pat. Off. |
| 0389991 | 10/1990 | European Pat. Off. |
| 2275819 | 1/1976 | France |
| 2473766 | 7/1981 | France |
| 2558277 | 7/1985 | France |
| 2215489 | 9/1989 | United Kingdom |

*Primary Examiner*—Jerry Smith
*Assistant Examiner*—Paul Gordon
*Attorney, Agent, or Firm*—Sughrue, Mion, Zinn, Macpeak & Seas

[57] ABSTRACT

A programmable controller (PC) controlling the operation of a machine is described that executes a program written in a sequential function chart (SFC) language. The PC can generate a reverse operation sequence chart from an ordinary operation SFC program sequence chart. This allows the PC to control the machine in the reverse direction. Thus, if a machine experiences a failure, the reverse operation sequence chart is used and reverse operations are performed to allow the cause of the failure to be removed. The ordinary operation can resume without having to restart the sequence from the beginning.

6 Claims, 9 Drawing Sheets

A: CLAMP STROKE
B: CLAMP STROKE
C: GAUGE STROKE $X_0, X_1, X_2$ 「OUTGOING」 LIMIT
$X_{10}, X_{11}, X_{12}$ 「RETURN」 LIMIT
$Y_0, Y_1, Y_2$ 「OUTGOING」 OUTPUT
$Y_{10}, Y_{11}, Y_{12}$ 「RETURN」 OUTPUT

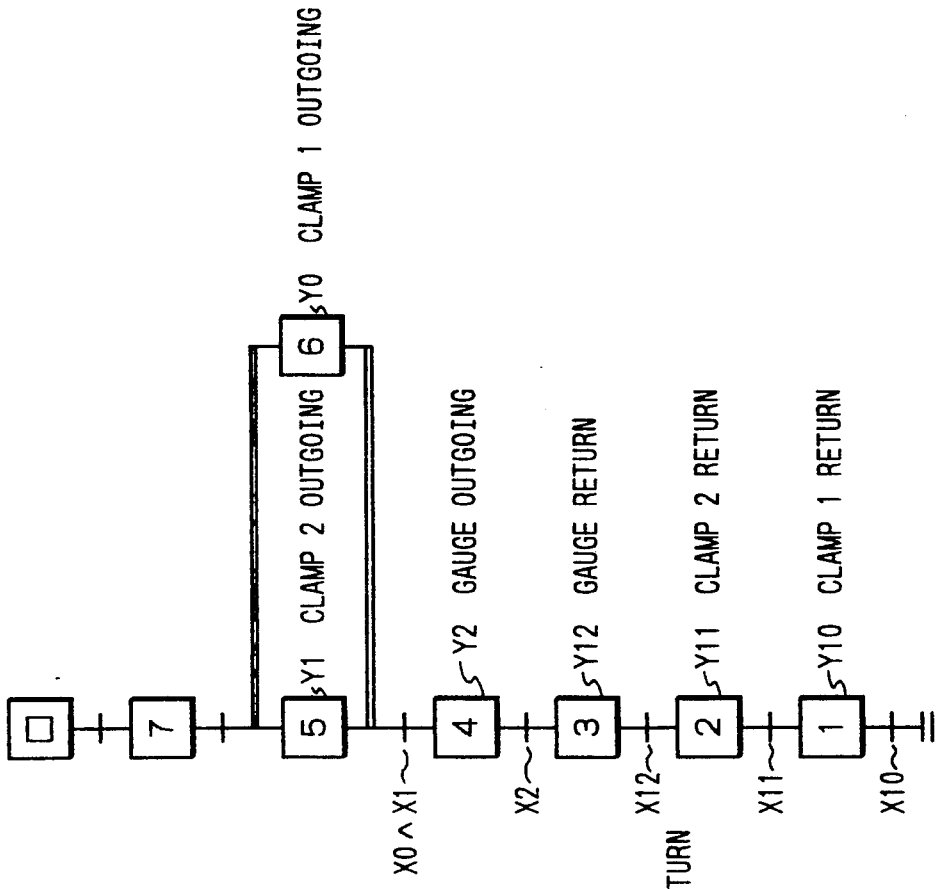
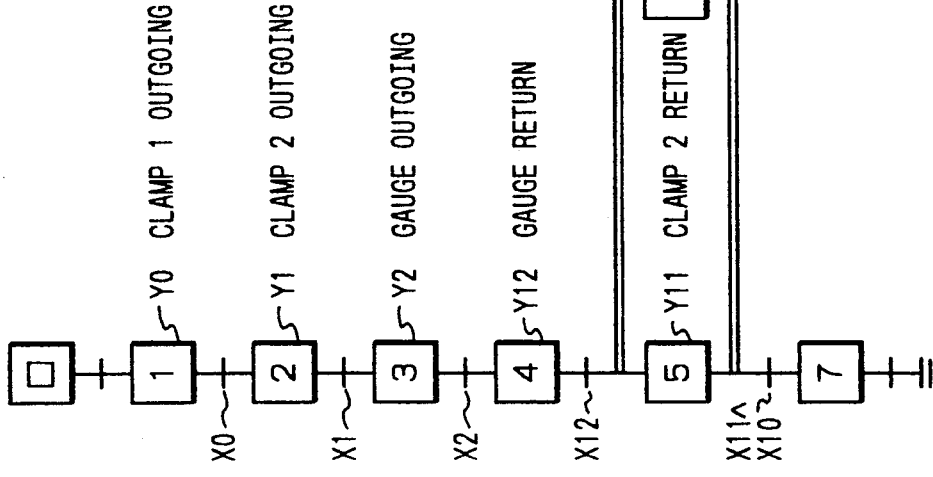
FIG. 4

| STEP No. | 4A | | |
|---|---|---|---|
| 0 | | | |
| 1 | X 0 | | |
| 2 | X 1 | | |
| 3 | X 2 | | |
| 4 | X12 | | |
| 5 | X11 | 6 | X10 |
| 7 | | | |
| E | | | |

| | 5A |
|---|---|
| 0 | |
| 1 | Y 0 |
| 2 | Y 1 |
| 3 | Y 2 |
| 4 | Y12 |
| 5 | Y11 |
| 6 | Y10 |
| 7 | |
| E | |

3B

| STEP No. | 4B | | |
|---|---|---|---|
| 0 | | | |
| 7 | | | |
| 5 | X 1 | 6 | X 0 |
| 4 | X 2 | | |
| 3 | X12 | | |
| 2 | X11 | | |
| 1 | X10 | | |
| E | | | |

| | 5B |
|---|---|
| 0 | |
| 1 | Y10 |
| 2 | Y11 |
| 3 | Y12 |
| 4 | Y 2 |
| 5 | Y 1 |
| 6 | Y 0 |
| 7 | |
| E | |

ACTIVE STEP No. — 6

4A: FIRST TRANSITION TABLE  5A: FIRST OUTPUT TABLE
4B: SECOND TRANSITION TABLE  5B: SECOND OUTPUT TABLE

SEQUENTIAL FUNCTION CHART (SFC) CONTROLLER FOR CONTROLLING A MACHINE IN REVERSE OPERATION

BACKGROUND OF THE INVENTION

1. Field of the Invention

This invention relates generally to the field of controlling of machines using a programmable controller (PC), and, more particularly, to a PC executing a program written in the sequential function chart (SFC) programming language.

2. Description of the Prior Art

FIG. 7 is a block diagram of a known PC used for executing a control program written in an SFC language to control an object, such as a machine. The PC comprises a sequence chart controller 2 for performing control of the PC, a sequence chart table 3 having a transition table for storing transition information used in comparison to input conditions of the machine, and an output table 5 for storing output signal numbers making up the control program used to control the operation of the machine. Both the transition information stored in transition table 4 and the output signal numbers stored in the output table 5 are sequentially arranged according to the sequence of step numbers 0, 1, 2 ... 7, E set forth in the sequence chart of FIG. 9.

FIG. 10 illustrates the contents of sequence chart table 3 (FIG. 7). In particular, the figure illustrates the transition information stored in transition table 4 according to step numbers 0-E. The figure also illustrates the output signal numbers stored in the output table 5 according to step numbers 0-E.

The PC 1 controls a machine (not shown) according to the execution by sequence chart controller 2 of a sequence of steps 0-E making up the control program stored in sequence chart table 3. With reference to FIG. 8, it can be seen that the sequence chart controller 2 starts the execution at step 200. The controller 2 first obtains the step number stored in active step number table 6 (FIG. 7). This is performed in block 201. The controller 2 determines whether or not the indicated step is an END (E) step. If the E step is determined, the execution proceeds to block 210 and is completed. If, on the other hand, the step is not an E step, then the execution of the program advances to block 203. In this block, the sequence chart controller 2 obtains the output number from the output table 5 corresponding to the active step stored in active step table 6 (FIG. 10). This output number is sent by the PC 1 to the output signal line 11 (FIG. 7) in block 204. The controller 2 then obtains transition information corresponding to the active step number from the transition table 4 (FIG. 10) during block 205. At decision block 206, the controller 2 determines whether or not an input signal X has been received over input signal line 9 (FIG. 7), and if it matches the transition information stored in transition table 4 corresponding to the active step number currently being executed. If there has not been a favorable comparison, then the execution moves back to block 201 without any further operation. If, on the other hand, there has been a favorable comparison to the transition information, then a pointer is shifted to a subsequent step number in the transition table 4. That subsequent step number is stored in active step number table 6 (block 207). In block 209, the sequence chart controller 2 switches off the signal being output over signal line 11 (FIG. 7) and the execution of the program returns to block 201.

As described above, output table 5 (FIG. 10) stores a series of output signal numbers Y0, Y1, Y2, Y12, Y11, Y10 according to steps 1-6, respectively. These output signal numbers are output by the PC 1 over signal line 11 under control of sequence chart controller 2 (FIG. 7). The output numbers are used by the PC 1 to control the machine (not shown), where each output number forces the machine to perform a different function. To allow the PC 1 to more fully control the operation of the machine, feedback signals are received as input signals over signal line 9 (FIG. 7). The feedback signals can be output by limit switches (not shown) that indicate when a machine operation has been performed to a certain limit. Transition information X0, X1, X2, X12, X11, X10 stored in transition table 4 according to steps 1-6, respectively, allow the PC 1 to determine when these limits, indicated by the feedback signals, have been reached in the operation of the machine.

For example, if the active step number 1 stored in step number table 6 (FIG. 7) is currently being executed, then an output number Y0 (FIG. 10) will be output over signal line 11, causing a machine to perform an operation. Specifically, for example the output Y0 may cause a clamp 1 (not shown) of the machine to perform movement operation up until a specified position designated by limit switch X0 is detected (all switches may be logical switches). Upon this detection, input data X0 will be transmitted over signal line 9 and received by PC 1. During this time, the sequence chart controller 2 obtains the transition information X0 corresponding to the step number 1 currently being executed. Upon detecting a favorable comparison between the input signal data and the transition information stored in transition table 4, the sequence controller 2 terminates the output of signal number Y0 and advances to the next subsequent step number in transition table 4. This step number is stored in active step number table 6.

The execution of the sequence is then continued for step numbers 2-E (FIG. 9). As can be seen from FIG. 10, output numbers Y1, Y2, Y12, Y11 and Y10 will be output in the manner described above until limit switch data X1, X2, X12, X11 and X10 are detected by the sequence controller 2, respectively. In this known structure, output Y1 causes a clamp 2 (not shown) to perform an operation until a position is detected by limit switch X1. Output Y2 causes a gauge (not shown) to perform an operation in one direction up until a specified limit switch X2. After that, an output Y12 causes the same gauge to perform a return operation to the position specified by limit switch X12. Then outputs Y10 and Y11 cause clamps 1 and 2 to perform return operations up to the position specified by limit switches X10 and X11, respectively. The above operations can be seen in the timing chart in FIG. 3, and are written in the SFC language as shown in FIG. 9.

FIG. 9 more clearly depicts the sequence of steps making up the control program described above. The blocks having numerals inserted therein depict the sequence of steps 1-7 performed by the sequence controller 2. During step 1, it can be seen that an output number Y0 is output, as described above, until transition information X0 is received by the sequence controller 2. After this time, sequence step 2 is performed, outputting a number Y1 until a transition information X1 is received by sequence controller 2 over the input signal line 9. A similar pattern of events occurs until step 7 is executed and step E is determined. After detecting step E, sequence controller 2 terminates the execution of the program and, thus, terminates the control of the machine.

The above-described PC known in the art is only allowed to execute the SFC language sequence chart in the order of step numbers 0-E set forth in the sequence chart of FIG. 9. If the machine that is controlled has stopped due to a fault, for example, the operation cannot be resumed by reversing the operation of the machine so that the cause of the fault can be removed.

Accordingly, a need exists in the art for a process of running a programmable controller (PC) that executes a program written in an SFC language which allows an SFC language sequence chart to be executed in the reverse direction so that the object to be controlled may be controlled in the reverse operation. Moreover, there is a need in the art for reversing the operation so that the occurrence of a fault resulting in stoppage of machine operation can be removed without requiring the restarting of machine operation from the beginning of the sequence. Often, reverse operation of only a step or two can remedy the problem and allow normal operations to resume.

SUMMARY OF THE INVENTION

It is thus an object of the invention to overcome the disadvantages of the prior art by providing a PC with a process that allows an SFC language sequence chart to be executed in a reverse direction so that an object, such as a machine, to be controlled may be controlled in a reverse operation.

It is a further object of the invention to provide reverse operation of a machine that has been stopped due to a fault so that the fault can be removed without restarting the operation from the beginning of the sequence.

It is yet another object of the invention to provide a process for generating a reverse sequence chart from an ordinary operation SFC program sequence chart to be used by a programmable controller in the alternative.

The above and other objects of the invention are realized by a programmable controller in accordance with the present invention, having a first transition table which stores transition information according to an order of sequential steps. This information, as in the prior art, is used for checking the input conditions corresponding to feedback signals from a machine that allow a programmable controller (PC) to monitor and control the operation of the machine. A first output table is used for storing output signal numbers according to the set of sequential steps. The output signal numbers are used, as in the prior art, by the PC to control specific operations of the machine. A second transition table is provided for numbering the transition information stored in the first transition table in a reverse order, and for storing the results therein. A second output table is provided for sorting the output signal numbers stored in the first output table in a reverse order, and also storing the results therein.

A first SFC program running means runs the output program stored in the first output table according to the stored sequence of steps. A second SFC program running means stops the execution of the control program stored in the first output table when a preset program running condition is not established or an external command is entered. This running means executes a corresponding output number stored in the second output table under control of the transition information stored in the second transition table. The program is started with the current step number for which the first SFC program running means had been executing at the time it was stopped. An SFC program run resuming means stops the run of the output program stored in the second output table when the preset program running condition has been reestablished or a new external command is entered. The SFC program run resuming means resumes the running of an output number stored in the first output table. Execution resumes at the step number where the program had been stopped.

In this manner, it is apparent that the present invention allows a PC to control a machine in a reverse operation. The present invention has a significant advantage of easily restoring a machine to normal operation after it has failed without restarting the operation from the beginning of the sequence.

BRIEF DESCRIPTION OF THE DRAWINGS

The foregoing and other structures and teachings of the invention will become more apparent upon describing the best mode for carrying out the invention, as rendered below. In the description to follow, reference will be made to the accompanying drawings, in which:

FIG. 4 illustrates two sequence charts depicting the operational flow of a PC in ordinary and reverse operations.

FIG. 5 is a block diagram illustrating the sequence chart table of the PC.

DESCRIPTION OF THE PREFERRED EMBODIMENT

The present invention will now be described with reference to FIGS. 1-6, wherein structural elements identical to those in the prior art described above are designated with identical or corresponding numbers.

Figure 1:
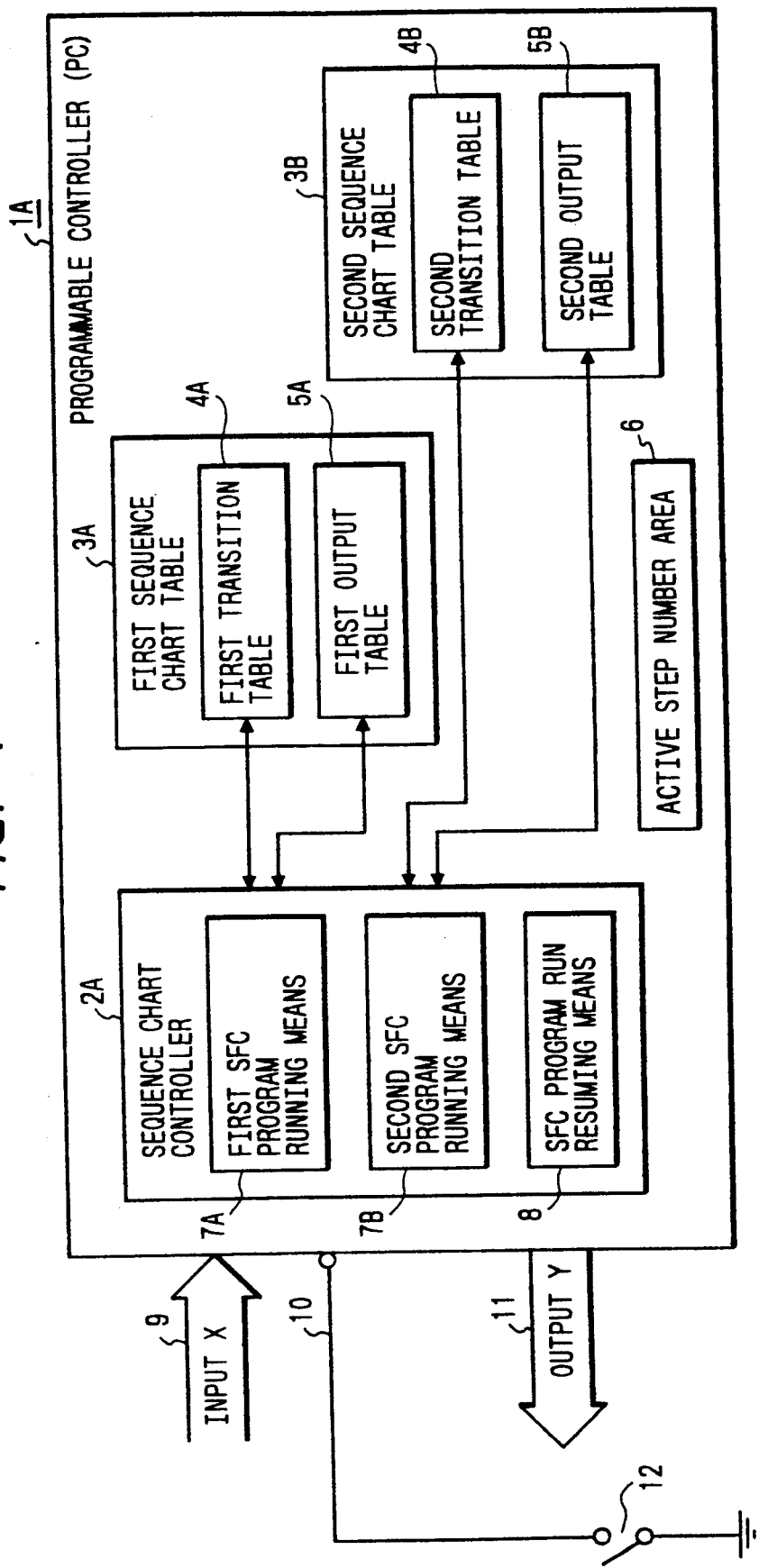
FIG. 1 is a block diagram of a program controller (PC) according to the present invention.
Figure 7:
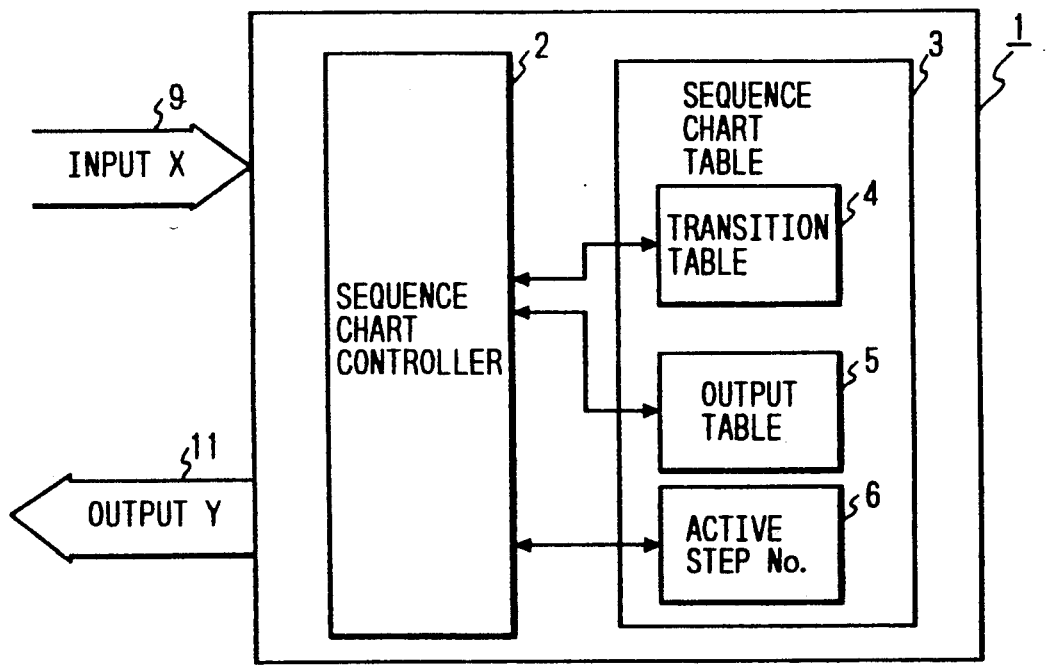
FIG. 7 is a block diagram of a known PC.

As shown in FIG. 1, a programmable controller (PC) 1A, according to the present invention, has input and output signal lines 9 and 11, respectively, performing functions identical to those of prior art FIG. 7 described above. The PC 1A also has an active step number table 6 identical to that of the prior art. The major structural differences between the PC 1A and that of the prior art are in the sequence chart controller 2A, the first sequence chart table 3A, and the second sequence chart table 3B. The first sequence chart table 3A has a first transition table 4A that stores transition information used to check the input conditions received over input signal lines 9 from the controlled machine. The sequence chart table 3A also contains a first output table 5A for storing outputs over signal line 11 used by PC 1A to control the operation of the machine. Both the transition information and the outputs are stored in a sequential order designated by sequence chart 1 (shown in FIG. 4). A second sequence chart table 3B has a second transition table 4B for renumbering the transition information that is stored in the first transition table 4A in reverse order, and storing the results thereof. The second sequence chart table 3B has a second output table 5B for sorting the outputs that are stored in the first output table 5A in reverse order and storing the results thereof. Both the transition information and the outputs stored in tables 4B and 5B, respectively, follow a sequential order of steps shown in sequence chart 2 (FIG. 4).

The sequence chart controller 2A has a first SFC program running means 7A which sequentially executes the control program stored in the first output table 5A according to the sequence set forth in sequence chart 1 (FIG. 4). This is done in accordance with the transition information stored in the first transition table 4A in a manner similar to that of the prior art described above. However, the sequence chart controller 2A also has a second SFC program running means 7B which stops the execution of the control program stored in the first output table 5A when a preset program running condition is not established. For example, when a failure in operation of the machine is experienced, the control program cannot be run successfully; this causes the sequence controller 2A to stop the execution of the program. In the alternative, the second SFC program running means may stop the running of the control program upon receiving a reversing command signal, represented by switch 12 and signal line 10 (FIG. 1). The second SFC program running means 7B, upon either of these conditions, runs the corresponding control program stored in the second output table 5B, starting with the step number currently stored in the active step number table 6. The active step number would be the current step number of the control program at the time operation was stopped.

The sequence chart controller 2A also includes SFC program run resuming means 8 which stops the running of the control program stored in the second output table 5B when the aforementioned program run stopping condition is reestablished or a new external command is entered. This causes the first program running means 7A to resume the running of the output program stored in the first output table 5A in accordance with the transition information stored in the first transition table 4A, as described above. The execution of the control program resumes with the step number then stored in the active step number table 6.

Figure 2:
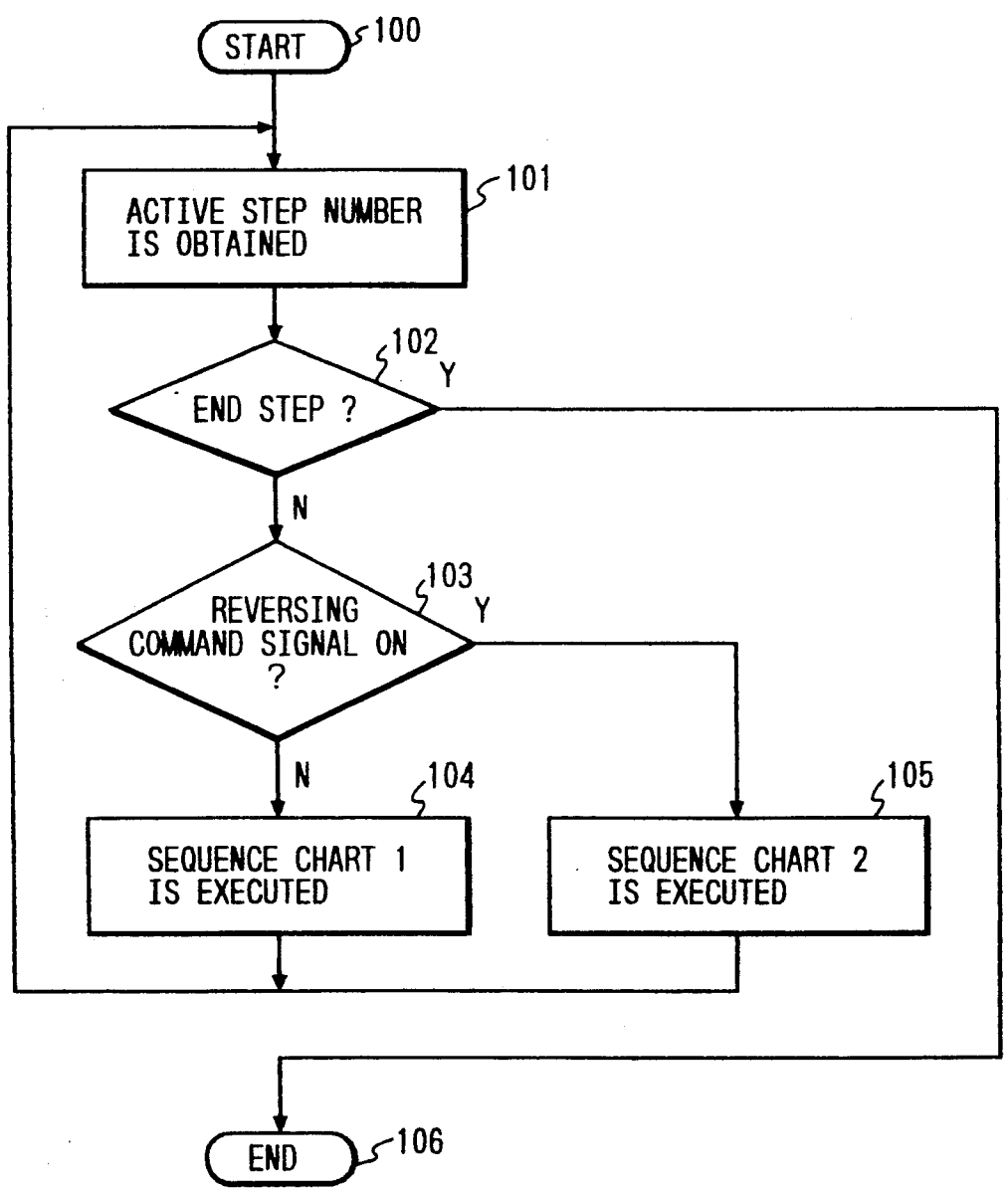
FIG. 2 is a flow chart illustrating the operational flow of a PC according to the present invention.
Figure 3:
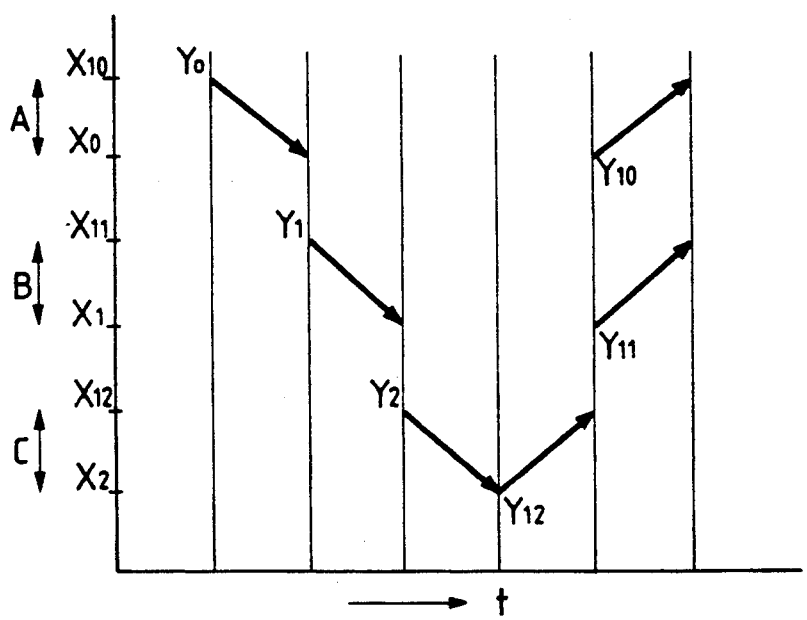
FIG. 3 is a timing diagram depicting the operation of a machine under control of a PC according to the present invention.
Figure 8:
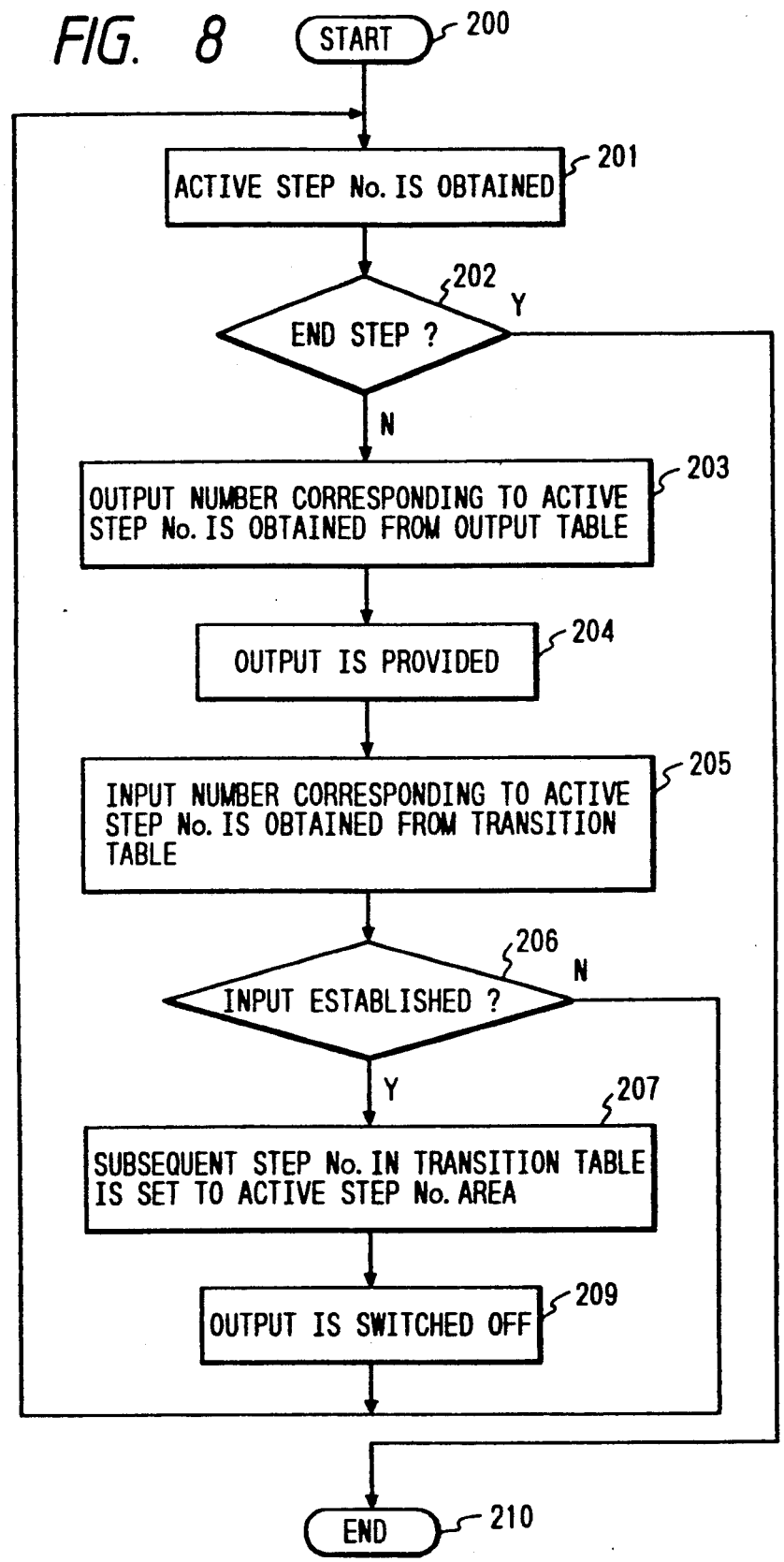
FIG. 8 is a flow chart of the operational flow of a known PC.

FIG. 2 is a flow chart illustrating the operation of the sequence chart controller 2A. The operation of the sequence chart controller 2A begins at block 100. At block 101, the first SFC program running means 7A obtains the step number to be executed from the active step number table 6. It then determines whether or not the step is an END (E) step or not, at decision block 102. If the step is an E step, the operation is terminated without further execution. If the step is not an E step, the execution progresses to block 103, where the presence of the reversing command signal transmitted by switch 12 and signal line 10 is checked. If the signal is not present, an operation is performed according to the first sequence chart table 3A. In this case, operations are performed as per blocks 203 through 209 in FIG. 8, as described in the prior art. The operation then returns to block 101.

If the operator has pressed the reverse command switch 12 to switch on the reversing command signal 10, for example, the second sequence chart table 3B is executed. As described above, the second sequence chart table 3B contains a control program in reverse order to that in the first sequence chart table 3A. Hence, if the reversing command signal 10 is switched on during the gauge return operation at step 4 of sequence chart 1 (FIG. 4), output Y2 is provided according to the second output table 5B in the second sequence chart table 3B (see FIG. 5). Since this output is a gauge outgoing operation signal, the machine performs the reverse operation, i.e., switches from the gauge return operation to the gauge output operation. The timing chart of FIG. 3. illustrates the outgoing and return operations, and the "Y" outputs associated with each. When limit X2 is reached during the gauge outgoing operation, the pointer is shifted to the step subsequent to step 4 according to the transition table 4B; thus, step 3 is set as the active step number for execution. Thus, by turning on the reverse command signal 10 and switching control to the second sequence chart table 3B, the machine operation is performed in the reverse direction according to the sequence chart.

By switching off the reversing command signal 10 during the reverse operation, control is switched back to the first sequence chart table 3A. Since the step number stored in the active step number table 6 is executed at that time, the operation can be resumed from where the reverse operation has been halted.

Figure 9:
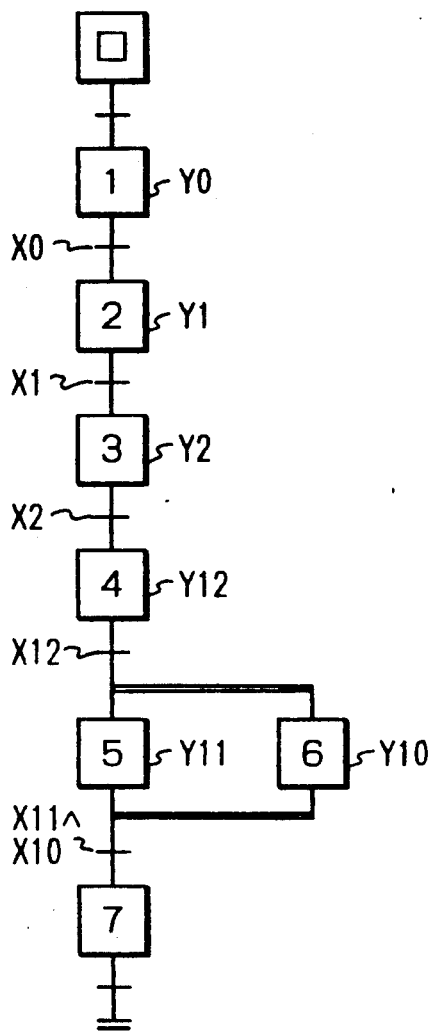
FIG. 9 is a sequence chart illustrating the sequence of perform steps performed by the known PC.
Figure 10:
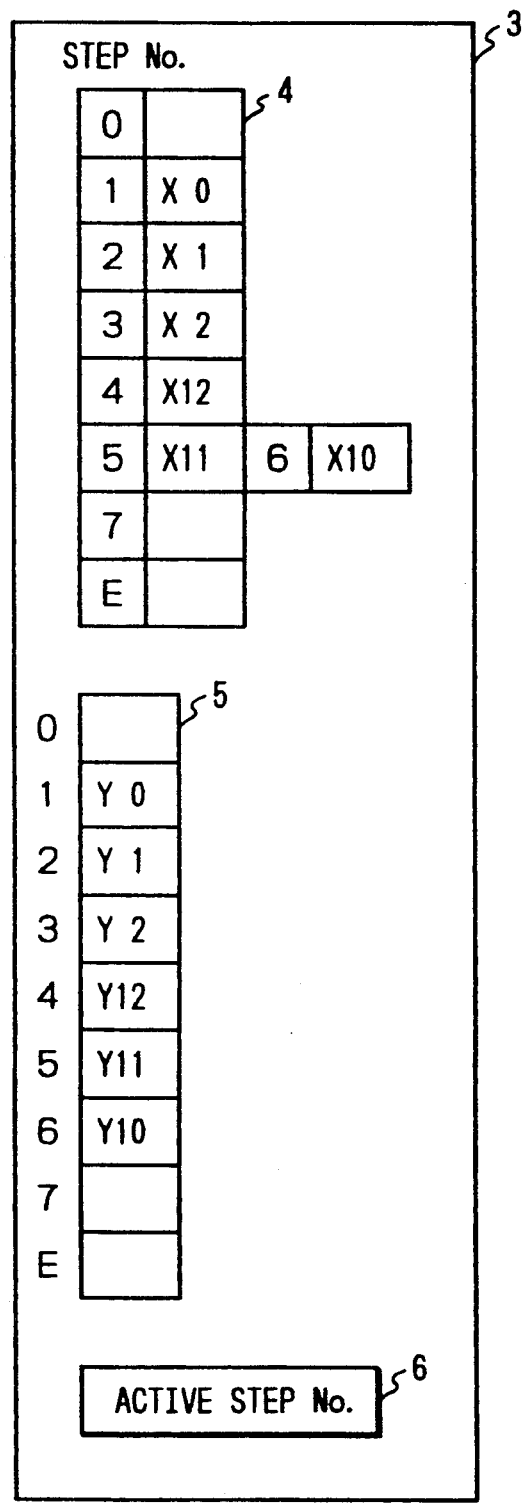
FIG. 10 is a block diagram of the sequence chart table stored in the known PC.

The sequence chart 1 of FIG. 4 sets forth a sequence of steps to be executed in the control program, as described above. As in prior art FIG. 9, described above, the blocks having numerals inserted therein indicate a sequence of steps 1-7 performed by the sequence controller 2A. The output numbers Y0, Y1, Y2, Y10, Y11 and Y12 represent the same (exemplary) operations of the machine as in the prior art description. Similarly, the transition information X0, X1, X2, X10, X11 and X12 represent the same limits as in the prior art description. Sequence chart 2 of FIG. 4 depicts the sequence of steps making up the control program in sequence chart 1 in reverse order. The two control programs are stored in first sequence chart table 3A and second sequence chart table 3B, respectively (FIG. 5).

With reference to FIG. 5, the first sequence chart table 3A is composed of first transition table 4A and first output table 5A. The first transition table 4A stores the step numbers 0–E and the corresponding transition information numbers X0–X12. Step numbers progress from top to bottom according to sequence chart 1. First output table 5A stores outputs numbered Y0–Y12 corresponding to the step numbers. The second sequence table 3B is composed of second transition table 4B and second output table 5B. Tables 4B and 5B store the same transition information and outputs as the first transition table 4A and the first output table 5A, but in reverse order.

Figure 6:
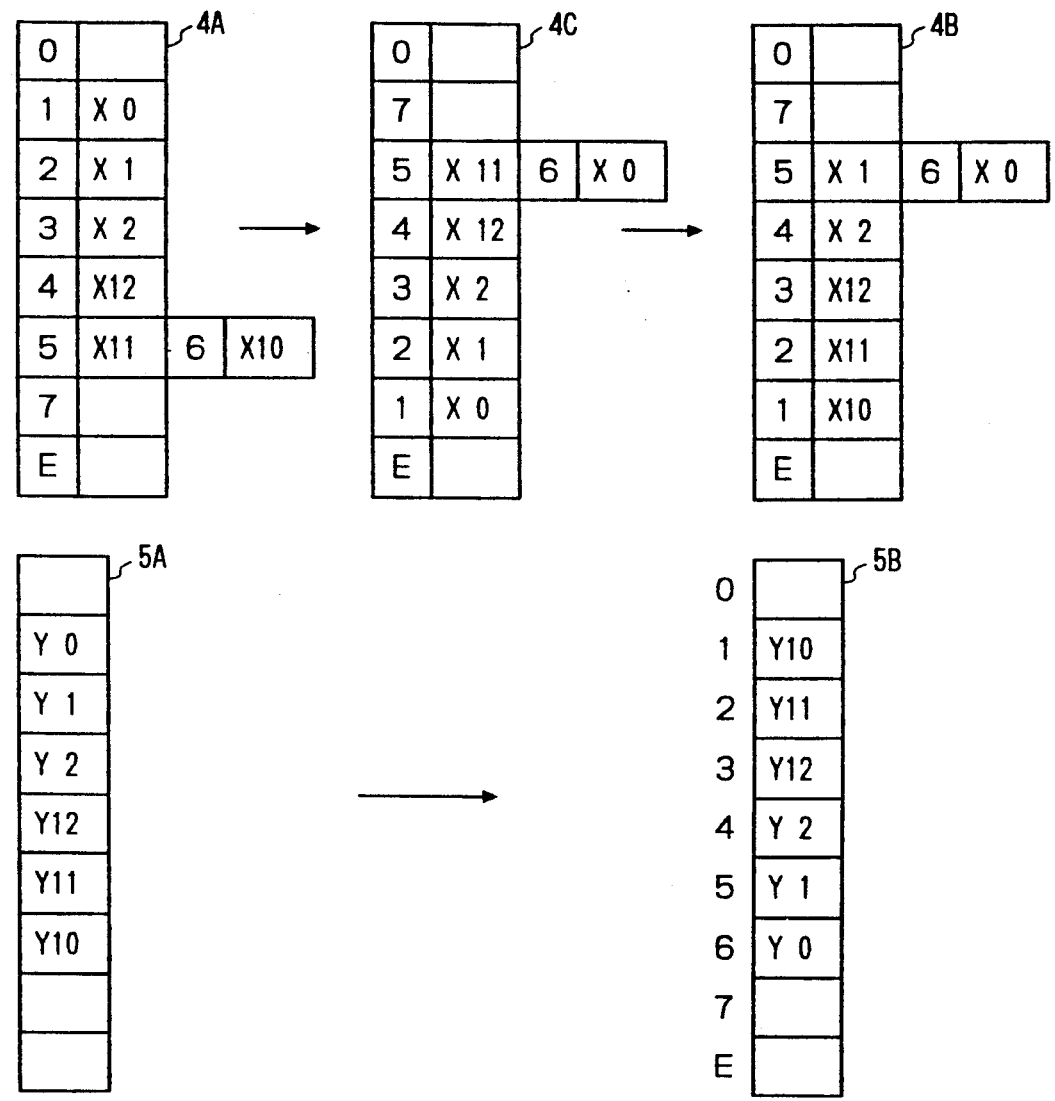
FIG. 6 illustrates the reversing of the sequential steps of the sequence chart for storage in the second transition table and second output table.

With reference to FIG. 6, the transition table 4A sorts the step numbers in reverse order with the exception of steps 0 and E. The result of the sorting is shown as a transition table 4C. It should be noted that, if the information in transition table 4C were used in place of the data in transition table 4B, then the reverse operation of the machine would not be controlled according to the proper sequence. For example, if the control program were stopped at step 4 of sequence chart 1, the normal return operation of the gauge (not shown) would be stopped. The sequence controller 2A would then begin executing the control program stored in table 5B beginning with step 4. At this time, an outgoing operation of the gauge would be performed according to step 4 of sequence chart 2 (FIG. 4). However, the transition information corresponding to step 4 in transition table 4C does not have the proper transition condition required to terminate the Y2 outgoing operation of the gauge. Instead of having transition information X12, the transition table should contain the transition condition X2.

To overcome this problem, as illustrated in FIG. 6, transition information designated by two-digit numbers are exchanged with the information designated by a one-digit number, and the information designated by a one-digit number is exchanged with the transition information designated by a two-digit number. For example, transition information designated by X1n is exchanged with information designated as Xn and transition information designated as Xn is exchanged with the transition information X1n. The results of the conversion are stored in transition table 4B. A similar conversion is made to store the outputs of table 5A in table 5B, which results in the outputs simply being reversed in this case. Thus, the above-described conversion process transforms the sequence of steps making up the control program of sequence chart 1 into the control program of sequence chart 2 (FIG. 4).

It will be appreciated that one sequence chart for ordinary operation and one for the reverse operation written for the above embodiments may be replaced by a plurality of reversing command signals and a plurality of reverse operation sequence charts to perform the reverse operation in accordance with the machine status when there are a plurality of reversing processing procedures.

It will be apparent that the invention, as described above, allows a programmable controller to generate a reverse operation sequence chart from an ordinary operation SFC program sequence chart for alternative execution. Therefore, according to the present invention, if the operation of a machine has failed, the reverse operation can be controlled so that the cause of failure can be removed and the machine may resume ordinary operation without restarting the entire sequence.

What is claimed is:

1. A programmable controller comprising:
    a first transition table for storing, in order of step number, transition conditions for checking input conditions corresponding to steps in an SFC program;
    a first output table for storing output numbers corresponding to the steps, in order of step number;
    a second transition table for numbering the transition conditions in reverse order to that stored in said first transition table, and storing the results;
    a second output table for sorting the output numbers stored in said first output table in reverse order, and storing the results;
    first SFC program running means using the output numbers stored in said first output table in order of step number in accordance with the transition conditions stored in said first transition table;
    second SFC program running means for stopping the execution of the running of the output numbers stored in said first output table when a preset program running condition is not established or an external command is entered, and for executing the corresponding output numbers stored in said second output table in accordance with the corresponding transition information stored in said second transition table, starting with a step number where the execution has been stopped; and
    SFC program run resuming means for stopping the use of the output numbers stored in said second output table when said program running condition is re-established or a new external command is entered, and for resuming the execution of the output numbers stored in said first output table in accordance with the corresponding transition information stored in said first transition table, starting with a step number where the use of the output numbers of said second output table has been stopped.

2. An SFC program running method for a programmable controller, comprising the steps of:
    storing in a first transition table, in order of step number, transition information for checking input conditions corresponding to steps in an SFC program;
    storing in a first output table output numbers corresponding to the steps;
    numbering the transition information in reverse order to that stored in said first transition table and storing the results into a second transition table;
    sorting the output numbers stored in said first output table in reverse order and storing the results into a second output table;
    running the output numbers stored in said first output table in order of step number in accordance with the transition information stored in said first transition table;
    stopping the execution of the running of the output numbers stored in said first output table when a preset program running condition is not established or an external command is entered and executing the corresponding output number stored in said second output table in accordance with the corresponding transition information stored in said second transition table, starting with a step number where execution has been stopped; and
    stopping the execution of the output numbers stored in said second output table when said program running condition is re-established or a new external command is entered, and resuming the run of the corresponding output number stored in said first output table in accordance with the corresponding transition information stored in said first transition table, starting with a step number where execution of the output numbers in said second output table has been stopped.

3. A programmable controller, comprising:
    a first table for storing, in order of step number, transition conditions corresponding to steps in a program;
    first output means for storing output numbers corresponding to the steps, in order of step number;
    a second table for numbering said conditions in reverse order to that stored in said first table, and storing the results;
    second output means for converting the output numbers stored in said first output means, and storing the results;

means for using the output numbers stored in said first output means in order of step number according to the conditions stored in said first table; and means for stopping use, by said using means, of the output numbers stored in said first output means upon a predetermined program stop condition, and for using the corresponding output numbers stored in said second output means according to the corresponding information stored in said second table, starting with a step number where the use has been stopped.

4. A programmable controller according to claim 3, further comprising:

means for stopping the use of the output numbers stored in said second output table when said program stop condition is terminated, and for resuming the use of the output numbers stored in said first output means according to the corresponding information stored in said first table, starting with a step number where the use of the output numbers of said second output means has been stopped.

5. A program running method for a programmable controller comprising the steps of:

storing in a first table, in order of step number, information for checking input conditions corresponding to steps in a program;

storing in a first output table output numbers corresponding to the steps in the program;

numbering the information in reverse order to that stored in said first table and storing the results in a second table;

sorting the output numbers stored in said first output table and storing the results into a second output table;

using the output numbers stored in said first output table in order of step number according to the information stored in said first table; and stopping use of the output numbers stored in said first output table when a program stop condition is reached and using the corresponding output number stored in said second output table according to the corresponding information stored in said second table, starting with a step number where the use has been stopped.

6. A program running method according to claim 5, further comprising:

stopping the use of the output numbers stored in said second output table when said program stop condition is terminated and resuming the use of the corresponding output number stored in said first output table according to the corresponding information stored in said first table, starting with a step number where the use of the output numbers in said second output table has been stopped.

* * * * *